RED-CORROSION-INHIBITED SILVER PLATED COPPER CONDUCTOR
IN CONTACT WITH A FLUORINATED OLEFIN POLYMER

Filed June 13, 1966

WILLIAM L. GREYSON
INVENTOR.

BY
McLean, Morton and Boustead
ATTORNEYS

United States Patent Office 3,397,046

Patented Aug. 13, 1968

3,397,046

RED-CORROSION-INHIBITED SILVER PLATED COPPER CONDUCTOR IN CONTACT WITH A FLUORINATED OLEFIN POLYMER

William L. Greyson, Chappaqua, N.Y., assignor to Tensolite Insulated Wire Co., Inc., Tarrytown, N.Y., a corporation of Delaware Continuation-in-part of application Ser. No. 212,150, July 24, 1962. This application June 13, 1966, Ser. No. 556,901

2 Claims. (Cl. 29—195)

ABSTRACT OF THE DISCLOSURE

An improved insulated electrical conductor which is resistant to corrosion is shown. The conductor includes a central copper conductor having a silver coating. The silver coating has an extremely thin coating of a cured organo polysiloxane which is derived from a monomethyl silicone fluid of specific characteristics and which is cured below the temperature at which silver cold fuses. The insulation which covers the so-coated conductors is a fluorinated olefin polymer. In a preferred embodiment, the silicone fluid in addition contains an alkoxide which further inhibits the "red" corrosion which develops on conventional silver coated copper conductors.

Figures 1, 2:
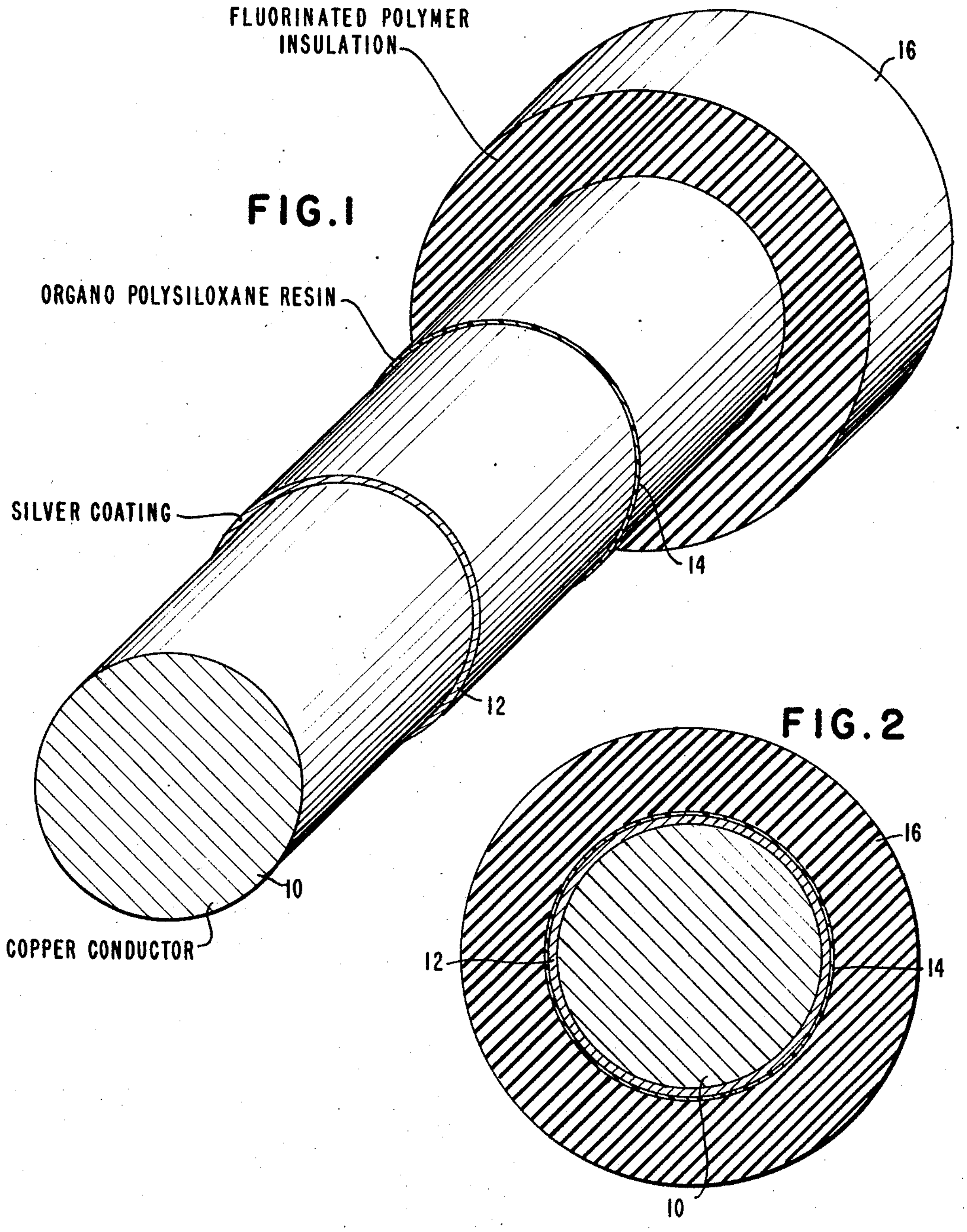

This application is a continuation-in-part of copending application Ser. No. 212,150, filed July 24, 1962, now abandoned.

This invention relates to insulated electrical conductors and in particular is directed to inhibiting a corrosion problem specific to conductors insulated with fluorinated olefin polymers.

Certain synthetic resins such as the polymers of tetrafluoroethylene, chlorotrifluoroethylene, hexafluoropropylene and their co-polymers have highly desirable dielectrical properties and because of their unusual chemical and thermal stability have found use as insulants for electrical conductors.

Because the fabricating temperatures of such polymers is quite high, however, it is necessary to employ silver plated copper conductors to avoid oxidation of the copper and consequent formation of cupric oxide. Despite the silver plating, however, occasionally a red corrosion developed on such silver plated conductors beneath the insulation.

It has been demonstrated that this red corrosion is cuprous oxide and is thought to be caused by the presence of air, i.e. oxygen, and moisture in contact with the couple produced between the two dissimilar metals. Because of their relative positions in the electromotive series the copper is sacrificial to the silver and will corrode preferentially to the silver. Such corrosion has been observed as a formation of red cuprous oxide beneath the silver plating which in extreme cases has erupted through the silver plating. The corrosion does not occur without the presence of moisture. Accelerating features appear to be salt, oxidation of either metal and stress in the conductor.

While the occurrence of this corrosion is extremely infrequent and has gone largely unnoticed for years the need for extreme reliability in electrical components has prompted the industry to search for a fool-proof method for eliminating red corrosion. Red corrosion does not seem to occur on a conductor with a nickel flash under the silver plate. With such a solution to the problem, however, the magnetic properties of the nickel flash may affect the circuit properties of the conductor. Since the problem usually occurs in the field after wire has been cut, another possible approach to eliminating the red corrosion problem is to seal the cut ends of all wire used in hook-up, a tedious solution at best.

I have found that the red corrosion problem can be reduced by simple treatment of silver plated wire with a silicone fluid which contains silane hydrogens. As is well known, silicone fluids are long organo-polysiloxane chains of alternating silicon and oxygen atoms having methyl and sometimes having some phenyl substituents on the silicon atoms, two such substituents usually being provided for each silicon atom except the terminal silicons which are provided with three such substituents. The silicone fluids which I have found useful are those in which many of the methyl (or phenyl) groups are replaced by hydrogen atoms and are commercially used for treatment of various products to form quick release or water repellant, resinous coatings. By coating a product with such a silicone fluid and then heat curing the coating cross-linkage of the polysiloxane chains may occur at the sites of the hydrogen atoms. Alternately, the silicon atoms at the sites of the hydrogen atoms may react with oxygen atoms on the surface of the product coated.

In the drawings:

FIG. 1 is a perspective view of the conductor of this invention with portions cut away; and FIG. 2 is a cross-sectional view showing the four discrete zones of conductors, coating and insulation.

In FIG. 1 reference numeral 10 refers to a cylindrical copper conductor. Reference numeral 12 refers to a thin coating of silver about the cylindrical copper conductor. Reference numeral 14 refers to an extremely thin coating of a cured organo polysiloxane which has been derived from a monomethyl silicone fluid containing from 1.0 to 1.6% silane hydrogen by weight having a viscosity in the range of 5–1000 centistokes at 25° C. The polysiloxane coating has been cured at a temperature below that at which silver cold fuses. Reference numeral 16 refers to an insulating layer of fluorinated polymer. In FIG. 2 the four discrete zones described above are shown in the cross-sectional view.

In general, such fluids used in accordance with this invention are polymers of methyl silane diol with small amounts of trimethyl silanol as a chain stopper and include polymers in which a proportion of dimethyl silane diol is also present, not in an amount, however, exceeding the monomethyl silane diol. It will be understood some of the methyl groups may be replaced by phenyl groups. Conventionally the silanol and silane diol precursors are alkoxides or chlorides which are hydrolyzed to effect the condensation. While the proportion of silanol (chain stopper) is not critical, as chain lengths in a viscosity range of 5 to 1000 and preferably 20–40 centistokes at 25° C. can be tolerated, the proportion of dimethyl substituted silicons is preferably small. For convenience the fluids used in accordance with this invention will therefore be described as "monomethyl silicone fluids."

I have also found even greater safety against corrosion which can be provided by adding to the monomethyl silicone fluid a compatible material which avidly reacts with moisture to remove it by using it in an irreversible chemical reaction.

Suitable compounds for effecting the moisture removal in accordance with this invention are preferably lower (methyl to amyl) alkoxide compounds of metals that form white or nearly colorless and relatively inert oxides. Aluminum triisopropoxide ($Al(OC_3H_7)_3$), aluminum triisobutoxide ($Al(OC_4H_9)_3$), tetrapropyl titanate $$Ti(OC_3H_7)_4$$

and tetrabutyl titanate ($Ti(OC_4H_9)_4$) are suitable compounds. These materials are compatible with monomethyl silicone fluid solutions in certain concentrations and are known to the trade as curing agents for silicones. In the presence of moisture, however, I have found they preferentially hydrolyze to form the oxide and alcohol the latter then being lost by evaporation.

The red corrosion inhibitors of this invention can be applied to the silver plated conductor either as a single filament conductor or as a stranded conductor by dip-coating, spraying, wiping or other conventional coating technique. As is well known, the coating can be cured by heating in the range of 250–350° F. for several hours to a few minutes depending on the temperature, the higher temperatures producing shorter curing times. The curing, which can take place on the wire prior to application of insulation, preferably is allowed to take place during the actual insulating operation since the temperatures and times conventionally required to insulate or to sinter the insulant also are adequate to effect a cure. On short lengths of stranded insulated conductor which have been previously fabricated it is also feasible to apply the corrosion inhibitor to the surface of the conductor by dipping an end of the conductor in the fluid and applying a partial vacuum to the other end of the conductor, provided that the treatment is made prior to the development of any red corrosion of the conductor. In such case a heat cure must be employed.

Since the monomethyl silicone fluids which are preferred have viscosities on the order of 20–40 centistokes it is usually preferable to dilute them with hydrocarbon solvents, acetone or methyl ethyl ketone, typically dilutions on the order of 2–1 with toluene for coating heavy conductors and as much as 6–1 for fine conductors. The silicone fluid is preferably sufficiently thinned such that after volatilization of the solvent only a fine film of silicone fluid remains, as larger quantities are not required to inhibit the red corrosion of the conductor and can interfere with proper electrical connection to the conductor. In general the amount of silicone fluid applied should be just sufficient to cover the surface with a monomolecular layer. It should be noted, however, that solvent volatilization and recovery may impose economic limitations on the amount of solvent employed.

The lower limit on the amount of alkoxide to be added to the silicone fluid is a function of the amount of extra protection that is desired. The upper limit is a function of the compatibility of the two materials and the subsequent modification of the silicone film. If too much alkoxide is added, several undesirable effects are noticed:

(1) The fluid or its solution will become gummy due to cross-linking of the silicone by the alkoxide, especially on aging.

(2) The fluid or its solution becomes too moisture sensitive to be commercially usable, as moisture in the air will react with the alkoxide.

(3) Chemical reactions occur between the alkoxide and the silane hydrogen, liberating hydrogen. In the case of titanium compounds, the hydrogen probably reduces the titanium to a lower valence and the solution becomes almost black.

(4) The heat cured silicone film on the conductor will no longer be a tightly adherent, flexible and durable coating.

The practical upper limit of all the above mentioned alkoxide compounds is in the neighborhood of two parts by weight of silicone fluid to one part by weight of alkoxide. The preferred upper limit, with excellent stability and providing adequate supplementary protection, is four parts of silicone fluid to one part of alkoxide. The preferred alkoxide is aluminum triisopropoxide.

In general such treatment of silver plated copper wire which is insulated with a halogenated olefin polymer in accordance with this invention effectively inhibits the problem of red corrosion and is equally applicable to wire in which the insulation is applied by extrusion, helical wrapping and parallel wrapping. It should be noted, however, in the case of tetrafluoroethylene polymer a hydrogen substituted methyl silicone fluid has been heretofore used as a coating for stranded silver plated copper wire in order to prevent cold fusing of the silver which was found to occur at the high temperatures required to sinter the tetrafluoroethylene polymer. This cold welding problem, however, has not been found to occur with other halogenated olefin polymers which are extruded conventionally at shorter periods of high heat such that the temperature reached by the wire is substantially lower.

Example I

A short length of insulated wire having a stranded shield formed of silver plated copper wire and an exterior jacket of a co-polymer of tetrafluoroethylene and hexafluoropropylene (Teflon FEP) was immersed at one end in a solution of monomethyl silicone fluid (Dow Corning 1107) having one hydrogen substituent for about every silicon atom (1.4–1.6% active hydrogen by weight) and having a viscosity at 25° C. of 20–40 centistokes which fluid was diluted with six volumes of toluene. A vacuum was applied to the other end of the section of wire until the diluted silicone fluid was observed at the end to which the vacuum was applied. The section of wire was then removed from the silicone fluid solution, and air was blown through the wire to remove excess fluid and evaporate the solvent. The section of wire was then cured in an oven for one minute at 500° F.

As noted above the red corrosion problem occurs only infrequently. In order to evaluate a technique for inhibiting red corrosion one suitable test which will induce red corrosion to a noticeable extent in a reasonable period of time involves introducing air laden with water vapor between the strands of the conductor under the insulation, or, in a shielded and jacketed construction, introducing the moisture into the shield under the jacket. Under these conditions corrosion can generally be noted in eight to twenty-four hours. At the end of seventy-two hours it is fully apparent except in very small wire sizes where the volume of air which can be moisture laden is very small. In these small sizes, ten days may be required for the corrosion to erupt through the silver and become visible.

The section of wire which had been treated in accordance with Example I and an identical section of wire which had not been so treated were placed in a container so that moisture and oxygen could be diffused through the shield under the jacket. At the end of four hours the untreated sample showed several instances of red corrosion while the treated sample was still bright and shiny. The untreated sample was then removed and another untreated sample substituted for it, and then moisture and oxygen diffusion continued. At the end of six hours the second untreated sample showed several instances of the red corrosion while the original treated sample showed no evidence of corrosion.

This test has been repeatedly made with conductors and shields made of silver plated copper and which have been treated with the monomethyl silicone fluid described above which consistently have failed to exhibit red corrosion, while control samples have corroded badly. In other tests where a dimethyl silicone fluid was substituted in the treatment for the monomethyl silicone, red corrosion was evidenced upon testing while similar samples treated with the monomethyl silicone fluid did not corrode.

Example II

Three samples of silver plated copper wire from the same spool were conditioned at 100% relative humidity. One sample was treated with silane monomethyl silicone fluid (Dow Corning 1107) reduced 1:6 with toluene. A second sample was treated dipping in a solution made up as follows:

| | | |
|---|---|---|
| Aluminum triisopropoxide | grams | 10 |
| Monomethyl silicone fluid (Dow Corning 1107) | cc | 40 |
| Toluene | cc | 240 |

The third sample was not given any treatment. All samples were cured for several minutes at 500° F. and then subjected to a moisture exposure. At the end of 24 hours, the untreated sample showed signs of reddish corrosion but the two treated samples were still bright and shiny. At the end of 72 hours, the untreated sample was badly corroded; the sample treated only with silane hydrogen silicone fluid showed several spots of reddish corrosion; and the sample treated with silicone fluid and aluminum isopropoxide was uncorroded.

On a still more severe test, samples of the same wire were saturated with a 0.02 M sodium chloride solution. They were then prepared as above: one sample treated with monomethyl silicone fluid; one simple treated with monomethyl silicone fluid plus aluminum isopropoxide; one sample untreated. All wires were cured for several minutes at 500° F. and reexposed to moisture. Part of each sample was stressed by winding it tightly around a ⅛" mandrel to form a helix. At the end of 24 hours of additional moisture exposure the untreated sample was corroded, particularly in the stressed area. The two treated samples were not noticeably corroded. At the end of one week, the corrosion was very noticeable to the naked eye. The untreated sample was badly corroded with red blotches, largely located in the stressed area, but some throughout the length. The treated samples were corroded slightly, only in the stressed area; the extent of corrosion on the sample without aluminum isopropoxide was greater, the metallic sheen having been lost in many areas.

Example III

A spool of No. 14 copper wire made up of 19 strands of No. 27 (.014") wire, each strand silver plated to a minimum thickness of 40 microinches of silver, is set up to pass through a treating bath and an oven to a takeup spool. The wire speed is 20 feet per minute. The bath is a monomethyl silicone fluid (Dow Corning 1107) diluted with 6 volumes of toluene and containing 25% by weight, based on the silicone, of tetrabutyl titanate. The oven is zoned so that the first section removes the solvent at 350° F. and the second section cures the fluid onto the wire at 700° F. All excess silicone-titanate-toluene solution is removed from the wire by felt wipers before it goes into the oven. This wire is thereby suitably protected from corrosion and can be run in a conventional Teflon TFE paste extruder (Jennings Machine Co., Phildelphia, Pa.—model TE–1 extruder) and insulated with Teflon TFE (T–6 or T6C—Du Pont) mixed with from 16 to 20% lubricant (VM & P naphtha or kerosene). In the curing process, a first oven removes the lubricant from the Teflon TFE paste (350° for naphtha, 550° F. for kerosene) and a second oven sinters the Teflon TFE (oven about 10 feet long adjusted to bring the surface temperature of the Teflon up to about 735° F.) running at 20 feet per minute.

Example IV

The extruder of Example III is set up so that as the wire enters the machine, it passes between two felt wipers which are saturated with the same silicone fluid-titanate-toluene solution. The solution is replenished by a filling mechanism which provides solution at a rate of one drop per minute. In this manner, the wire is coated with the solution and then coated with Teflon TFE extrusion paste as an in-line production method. The heat required to cure the Teflon TFE in the second oven is sufficient to cure the silicone while the solvent is driven off primarily in the first oven.

Example V

An AWG No. 30 conductor made up of 7 strands of No. 38 (.004") silver plated (minimum 40 microinches) copperweld (steel core inside each strand of copper) is prepared as follows: A Teflon TFE primary insulation of .043" is extruded over the conductor (same machine and compound as in Example III) and the insulation is shielded on a 16 carrier Wardwell braider with each carrier of the braider carrying 7 ends of No. 38 AWG silver plated copper (minimum 40 microinches). In line with the extruder are 2 felts saturated with a solution of the same monomethyl silicone fluid described above in six parts by volume of toluene with 25% by weight, based on the silicone, of aluminum triisobutoxide. A filling device is positioned to deliver the solution to the felts at 3 drops per minute. After being treated with the solution by passing between the felts, the wire is run through the cross head of a thermoplastic extruder (Hartig–2" barrel) charged with a copolymer of tetrafluoroethylene and hexafluoropropylene (Du Pont Teflon 100 FEP). Temperature settings on the barrel from rear to front are 620, 680, 750° F.; head 750°; die 765°; and the wire runs at 50 feet per minute. After running through the extruder, the wire passes into a cooling trough filled with water before spooling.

Example VI

Alternatively, the shielding wire in Example V can be coated before shielding at the respooling machine where the spools are prepared that hold 7 parallel wires per spool. In this case felt pads are used at the place where the parallel wires leave each spool, and the pads are fed with the silicone solution at one drop per minute.

Example VII

The shielded wire in Example V can also be taped with a Teflon TFE jacket instead of extruding Teflon 100 FEP. In this case, a conventional horizontal taping machine is employed to wrap unsintered Teflon TFE tape, .004" thick, ¾" wide helically with a ⅓ lap (3 layers). After taping, the wire is run through a curing oven whose temperature is adjusted so that the surface of the Teflon TFE is brought up to 750° F.

Example VIII

Alternatively, the shielded wire in Example V can be covered with an extruded Teflon TFE jacket in the same machine as in Example III, but with a larger die and at a slower speed. Before entering the extruder, if the shielding has not been previously treated with the corrosion inhibitor, the shielded wire is passed through the silicone-toluene-alkoxide solution saturated felts fed with the solution at one drop per minute.

Example IX

A No. 30 AWG conductor made up of 7 strands of No. 38 silver plated copperweld as in Example V is provided with a primary insulation of Teflon FEP in a thermoplastic extruder having a two inch barrel and in which the temperatures are arranged as in the thermoplastic extruder referred to in Example V except that the wire speed into the cross head is 100 feet per minute. In this case a coating of the 1:6 silicone-toluene-alkoxide solution used in Example I is applied to the wire using felt pads which are kept saturated with the solution and between which the wire passes as it enters the cross head of the extruder.

Example X

The procedure of Example V is repeated except that a jacket of chlorotrifluoroethylene polymer is extruded in the Hartig extruder over the silicone treated shield instead of the jacket of tetrafluoroethylene-hexafluoropropylene copolymer and employing the same speed as in Example V but 100° lower temperatures at the extruder.

Each of the above Examples I–X is illustrative of the preparation of silver plated copper conductors in a manner which, when the conductor is insulated or jacketed with a halogenated olefin polymer, will effectively inhibit development of red corrosion. It will be noted that most of the examples have been limited to jackets on braided shields for the reason that the red corrosion problem has not been found to any substantial extent on small conductors beneath the primary insulation.

Although the preceding examples have illustrated only a monomethyl silicone fluid with the preferred ratio of one hydrogen substituent for almost every silicon atom, up to half the silicons can be dimethyl substituted with equally effective results insofar as inhibition of red corrosion is concerned. Such siloxanes are, however, less desirable because—

(1) They do not have as many reaction sites, and (2) They form films on metals which are not as hard and durable as those formed with higher proportions of silane hydrogen and which are soft enough to be removed by slight abrasion.

Preferably the suitable silicones should contain from 1.0% to 1.6% silane hydrogen by weight.

I claim:

1. A silver coated copper conductor having:

(1) a coating of cured organo polysiloxane derived from a monomethyl silicone fluid containing from 1.0 to 1.6% silane hydrogen by weight and having a viscosity in the range of 5–1000 centistokes at 25° C., said fluid having been cured at a temperature below that at which silver cold fuses; and (2) an insulating layer of a solid polymer of fluorinated olefin in contact with and overlying said polysiloxane coated conductor.

2. A silver coated copper conductor having:

(1) a coating of a cured organo polysiloxane derived from a monomethyl silicone fluid containing from 1.0 to 1.6% silane hydrogen by weight and having a viscosity in the range of 5–1000 centistokes at 25° C. and an alkoxide in which each alkyl group contains 1 to 5 carbon atoms and which is selected from the group consisting of aluminum trialkoxides and tetraalkyl titanates, the proportion of said alkoxide to said silicone fluid being less than about 1 part by weight for each 2 parts by weight of silicone fluid; and (2) an insulating layer of a solid polymer of fluorinated olefin in contact with and overlying said polysiloxane coated conductor.

References Cited

UNITED STATES PATENTS

| | | | |
|---|---|---|---|
| 2,454,625 | 11/1948 | Bondon | 260—46.5 |
| 2,460,799 | 2/1949 | Barry | 260—46.5 |
| 2,494,920 | 1/1950 | Warrick | 117—71 |
| 2,523,037 | 9/1950 | Mathes | 260—46.5 |
| 2,688,182 | 9/1954 | Dorst | 29—195 |
| 2,864,728 | 12/1958 | Predota et al. | 117—232 |
| 2,906,009 | 9/1959 | Knoll et al. | 29—195 |
| 3,032,444 | 5/1962 | Scadron et al. | 117—119 X |
| 3,057,952 | 10/1962 | Gordon | 174—68.5 X |
| 3,152,999 | 10/1964 | Rust et al. | 117—161 |

OTHER REFERENCES

McGregor, R. R.: Silicones and Their Uses, McGraw-Hill Book Co., Inc., New York, 1954 (pp. 83–85 and 93–94 relied on).

WILLIAM D. MARTIN, *Primary Examiner.*

R. HUSACK, *Assistant Examiner.*